United States Patent
Yao et al.

(10) Patent No.: US 12,267,712 B2
(45) Date of Patent: Apr. 1, 2025

(54) END-TO-END (E2E) PERFORMANCE MEASUREMENTS IN 5G NETWORKS

(71) Applicant: Apple Inc., Cupertino, CA (US)

(72) Inventors: Yizhi Yao, Chandler, AZ (US); Joey Chou, Scottsdale, AZ (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/945,482

(22) Filed: Sep. 15, 2022

(65) Prior Publication Data
US 2023/0007520 A1 Jan. 5, 2023

Related U.S. Application Data

(62) Division of application No. 17/257,886, filed as application No. PCT/US2019/045253 on Aug. 6, 2019, now Pat. No. 11,765,608.
(Continued)

(51) Int. Cl.
*H04W 24/08* (2009.01)
*H04L 43/0852* (2022.01)

(52) U.S. Cl.
CPC ......... *H04W 24/08* (2013.01); *H04L 43/0852* (2013.01)

(58) Field of Classification Search
CPC .................................................. H04W 24/08
See application file for complete search history.

(56) References Cited

U.S. PATENT DOCUMENTS

| 2015/0263921 A1 | 9/2015 | Lef |
| 2017/0359749 A1 | 12/2017 | Dao |

(Continued)

FOREIGN PATENT DOCUMENTS

| CN | 1998195 | 7/2007 |
| CN | 101053270 | 10/2007 |

(Continued)

OTHER PUBLICATIONS

Office Action for CN Patent Application No. 2019800506936; Apr. 22, 2023.
(Continued)

*Primary Examiner* — Abdeltif Ajid
(74) *Attorney, Agent, or Firm* — Kowert, Hood, Munyon, Rankin & Goetzel, P.C.

(57) ABSTRACT

An apparatus of a management service equipment includes processing circuitry. To configure the management service equipment for E2E performance measurements in a 5G network with a plurality of network functions (NFs), the processing circuitry is to decode RAN latency received from a RAN within the 5G network. The RAN latency is associated with transmission of an Internet protocol (IP) packet between a UE and a data network (DN) via the RAN. A user plane function (UPF) latency associated with communication of the IP packet between the RAN and a UPF within the 5G network is determined. A DN latency associated with communication of the IP packet between the UPF and the DN is determined. An E2E performance measurement calculation is performed to determine an E2E latency associated with communicating the IP packet between the UE and the DN based on the RAN latency, the UPF latency, and the DN latency.

20 Claims, 9 Drawing Sheets

Related U.S. Application Data

(60) Provisional application No. 62/715,583, filed on Aug. 7, 2018.

(56) References Cited

U.S. PATENT DOCUMENTS

| | | | |
|---|---|---|---|
| 2017/0373950 A1 | 12/2017 | Szilagyi et al. | |
| 2019/0075552 A1* | 3/2019 | Yu | H04W 24/10 |
| 2020/0267088 A1* | 8/2020 | Navrátil | H04L 43/16 |
| 2021/0058302 A1* | 2/2021 | Marquezan | H04L 41/142 |

FOREIGN PATENT DOCUMENTS

| | | |
|---|---|---|
| CN | 101060367 | 10/2007 |
| CN | 106993260 | 7/2017 |
| KR | 1020170014796 A | 2/2017 |

OTHER PUBLICATIONS

International Search Report and Written Opinion for International Application No. PCT/US2019/045253, dated Nov. 20, 2019, 8 pgs.
3GPP; TSG SA; Management and orchestration of 5G networks; Performance measurements and assurance data (Release 15), 3GPP TS 28.552 V0.5.2, Aug. 3, 2018, 31 pgs.
Network Functions Virtualisation (NFV); NFV Security; Security and Trust Guidance', ETSI GS NFV-SEC 003 VI.1.1, Dec. 23, 2014, 57 pgs.
Vodafone, 'Discussion on URLLC KPis', SI-181332, 3GPP TSG-SA WGI Meeting #82, Dubrovnik, Croatia, May 15, 2018, 5 pgs.
"Management and Orchestration of 5G Networks; 5G End to End Key Performance Indicators (KPI)" (Release 15), 3GPP TS 28.554 V1.2.2, Aug. 2018, 15 pgs.
Partial Supplementary European Search Report, European Application No. 19846538.7, mailed Jun. 30, 2021, 15 pgs.

* cited by examiner

END-TO-END (E2E) PERFORMANCE MEASUREMENTS IN 5G NETWORKS

PRIORITY CLAIM

This application is a divisional of U.S. patent application Ser. No. 17/257,886, filed Jan. 5, 2021, which is a National Stage Entry of PCT/US2019/045253, filed Aug. 6, 2019, which claims the benefit of priority to U.S. Provisional Patent Application Ser. No. 62/715,583, filed Aug. 7, 2018, and entitled "End-to-End Performance Measurements for 5G Networks," each of which are incorporated herein by reference in their entirety.

TECHNICAL FIELD

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATS) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to configure E2E performance measurements in 5G-NR networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
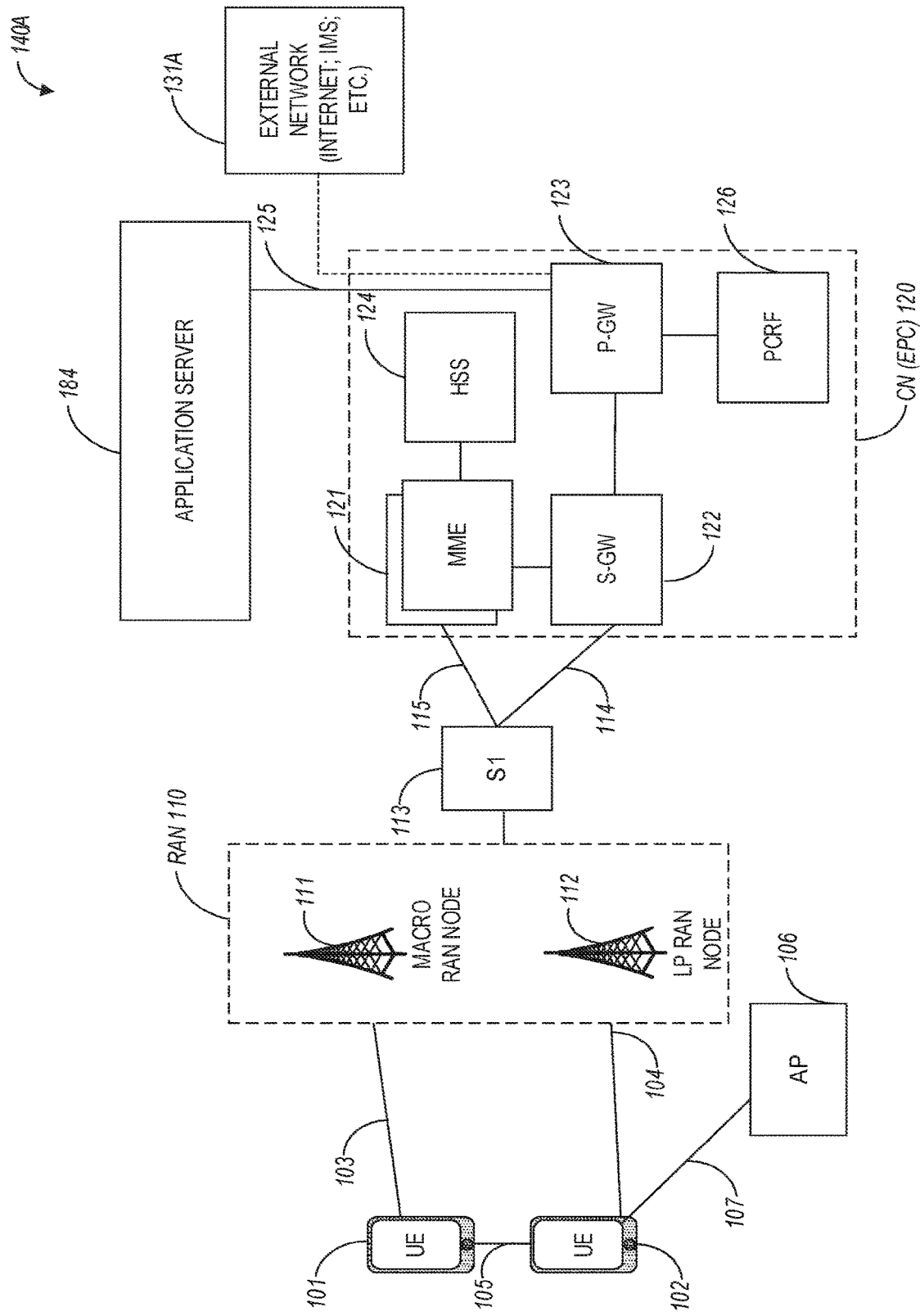
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for LTE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHZ, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, FIG. 1E, and FIG. 1F.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in macrocell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

Figure 1B:
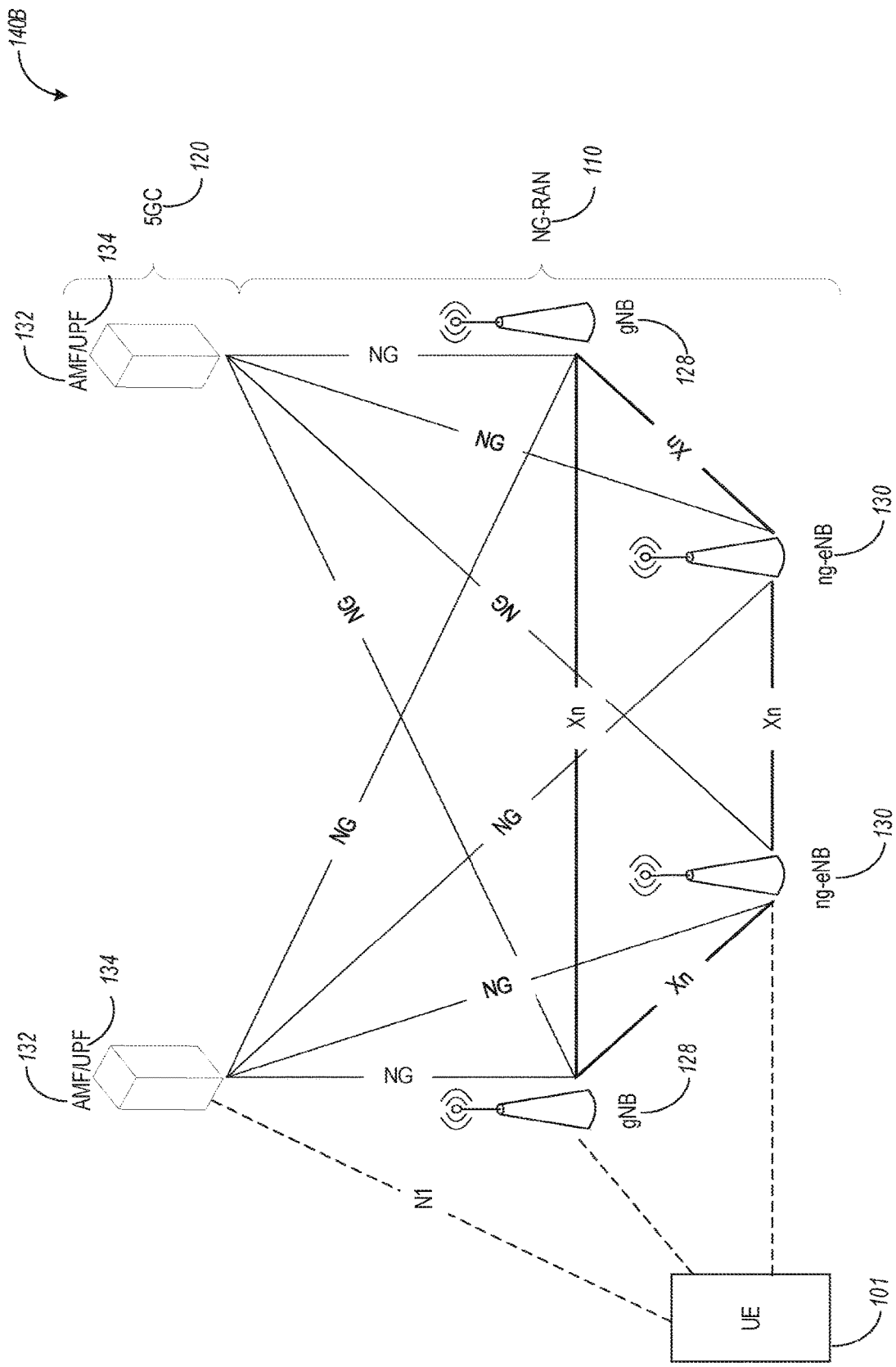
FIG. 1B is a simplified diagram of an overall next generation (NG) system architecture, in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, the NG system architecture 140B can use reference points between various nodes as provided by 3GPP Technical Specification (TS) 23.501 (e.g., V15.4.0, 2018-12).

In some aspects, each of the gNBs 128 and the NG-eNBs 130 can be implemented as a base station, a mobile edge server, a small cell, a home eNB, and so forth.

In some aspects, node 128 can be a master node (MN) and node 130 can be a secondary node (SN) in a 5G architecture. The MN 128 can be connected to the AMF 132 via an NG-C interface and to the SN 128 via an XN-C interface. The MN 128 can be connected to the UPF 134 via an NG-U interface and to the SN 128 via an XN-U interface.

Figure 1C:
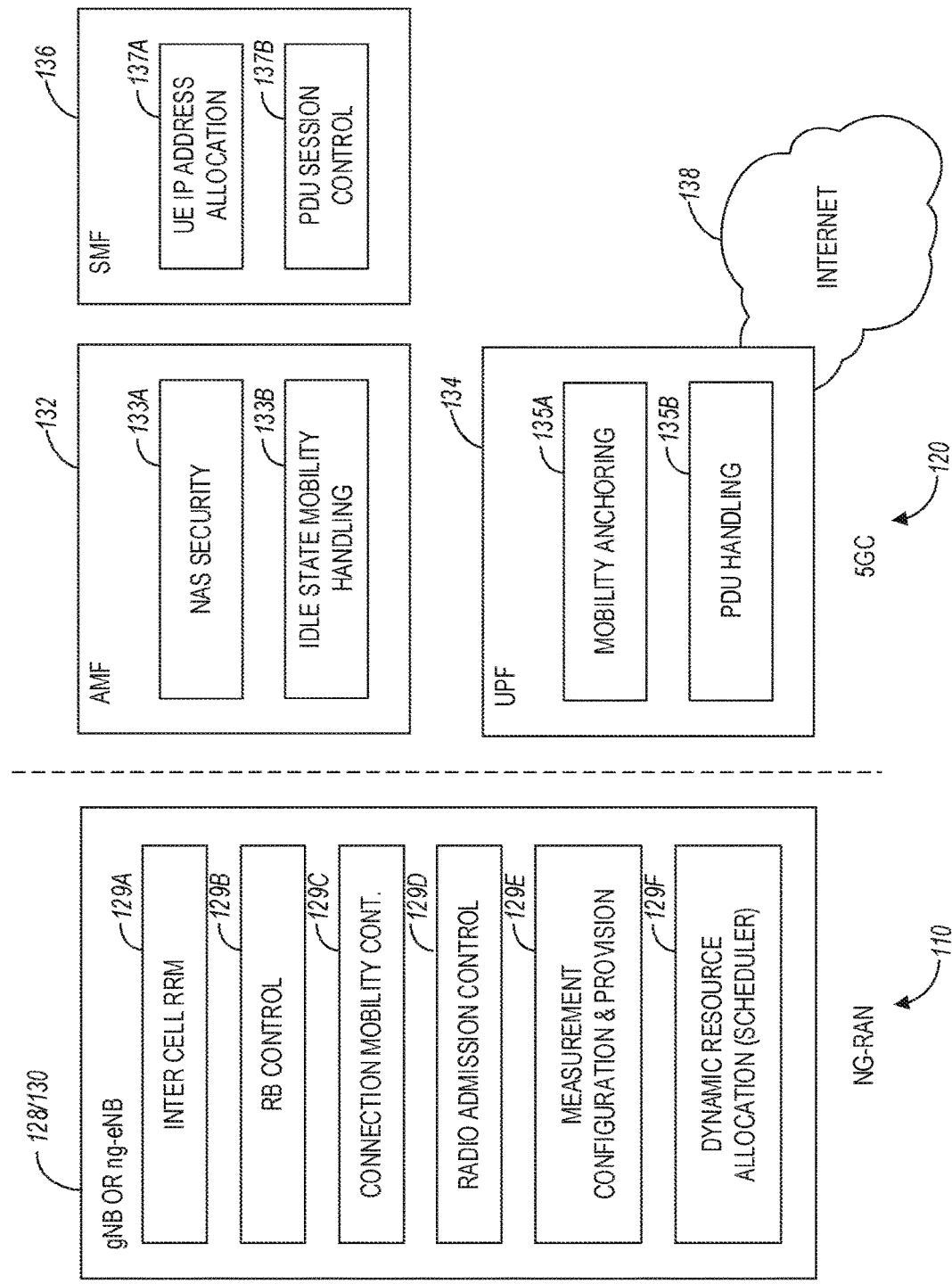
FIG. 1C illustrates a functional split between next generation radio access network (NG-RAN) and the 5G Core network (5GC), in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1D:
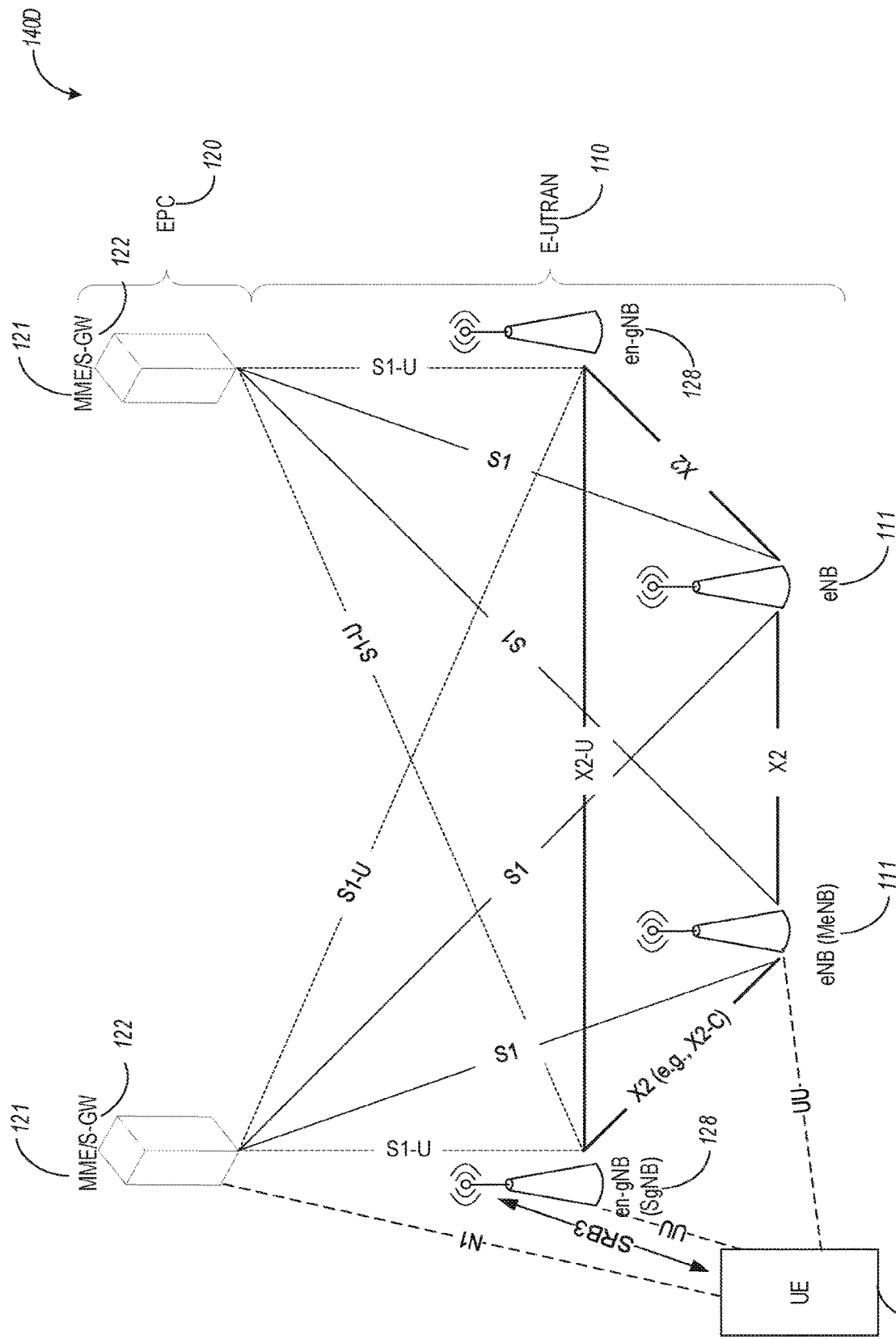
FIG. 1D illustrates an example Evolved Universal Terrestrial Radio Access (E-UTRA) New Radio Dual Connectivity (EN-DC) architecture, in accordance with some aspects.

FIG. 1D illustrates an example Evolved Universal Terrestrial Radio Access (E-UTRA) New Radio Dual Connectivity (EN-DC) architecture, in accordance with some aspects. Referring to FIG. 1D, the EN-DC architecture 140D includes radio access network (or E-TRA network, or E-TRAN) 110 and EPC 120. The EPC 120 can include MMEs 121 and S-GWs 122. The E-UTRAN 110 can include nodes 111 (e.g. eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140D. The eNBs 111 can be configured as master nodes (or MeNBs) and the eNBs 128 can be configured as secondary nodes (or SgNBs) in the EN-DC communication architecture 140D. As illustrated in FIG. 1D, the eNBs 111 are connected to the EPC 120 via the S1 interface and to the EN-gNBs 128 via the X2 interface. The EN-gNBs (or SgNBs) 128 may be connected to the EPC 120 via the S1-U interface, and to other EN-gNBs via the X2-U interface. The SgNB 128 can communicate with the UE 102 via a UU interface (e.g., using signaling radio bearer type 3, or SRB3 communications as illustrated in FIG. 1D), and with the MeNB 111 via an X2 interface (e.g., X2-C interface). The MeNB 111 can communicate with the UE 102 via a UU interface.

Even though FIG. 1D is described in connection with EN-DC communication environment, other types of dual connectivity communication architectures (e.g., when the UE 102 is connected to a master node and a secondary node) can also use the techniques disclosed herein.

In some aspects, the MeNB 111 can be connected to the MME 121 via S1-MME interface and to the SgNB 128 via an X2-C interface. In some aspects, the MeNB 111 can be connected to the SGW 122 via S1-U interface and to the SgNB 128 via an X2-U interface. In some aspects associated with dual connectivity (DC) and/or MultiRate-DC (MR-DC), the Master eNB (MeNB) can offload user plane traffic to the Secondary gNB (SgNB) via split bearer or SCG (Secondary Cell Group) split bearer.

Figure 1E:
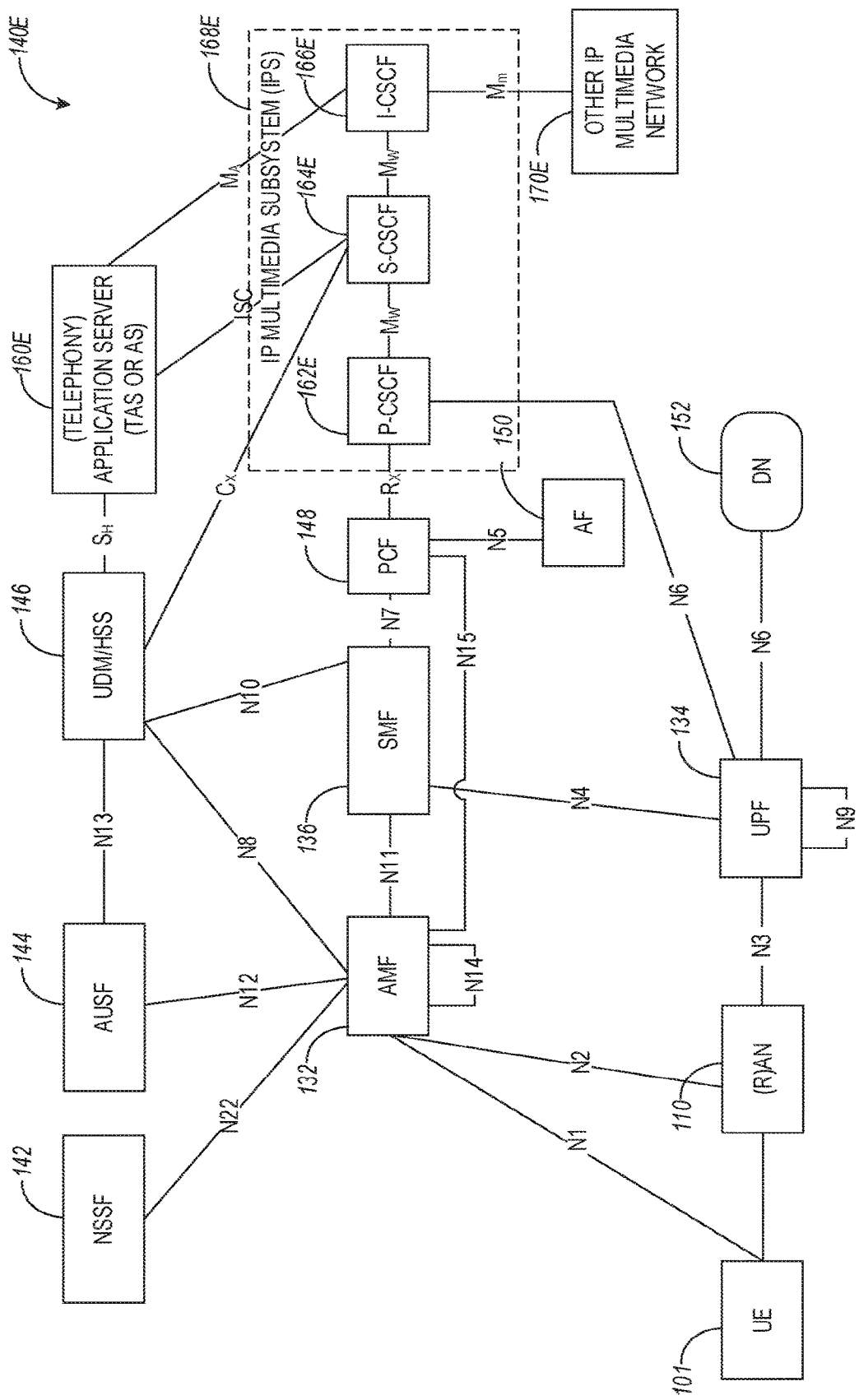
FIG. 1E and FIG. 1F illustrate a non-roaming 5G system architecture in accordance with some aspects.

FIG. 1E illustrates a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMP 132 can be used to manage access control and mobility and can also include network slice selection functionality. The SMF 136 can be configured to set up and manage various sessions according to a network policy. The UPF 134 can be deployed in one or more configurations according to a desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCE can be configured to handle certain aspects of emergency sessions such as routing an emergency request to the correct emergency center or PSAP. The I-CSCF 166E can be configured to function as the contact point within an operator's network for all IMS connections destined to a subscriber of that network operator, or a roaming subscriber currently located within that network operator's service area. In some aspects, the I-CSCF 166E can be connected to another IP multimedia network 170E, e.g. an LMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E or the I-CSCF 166E. In some aspects, the 5G system architecture 140E can use unified access barring mechanism using one or more of the techniques described herein, which access barring mechanism can be applied for all RRC states of the UE 102, such as RRC_IDLE, RRC_CONNECTED, and RRC_INACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator-specific ways.

A reference point representation shows that interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1F:
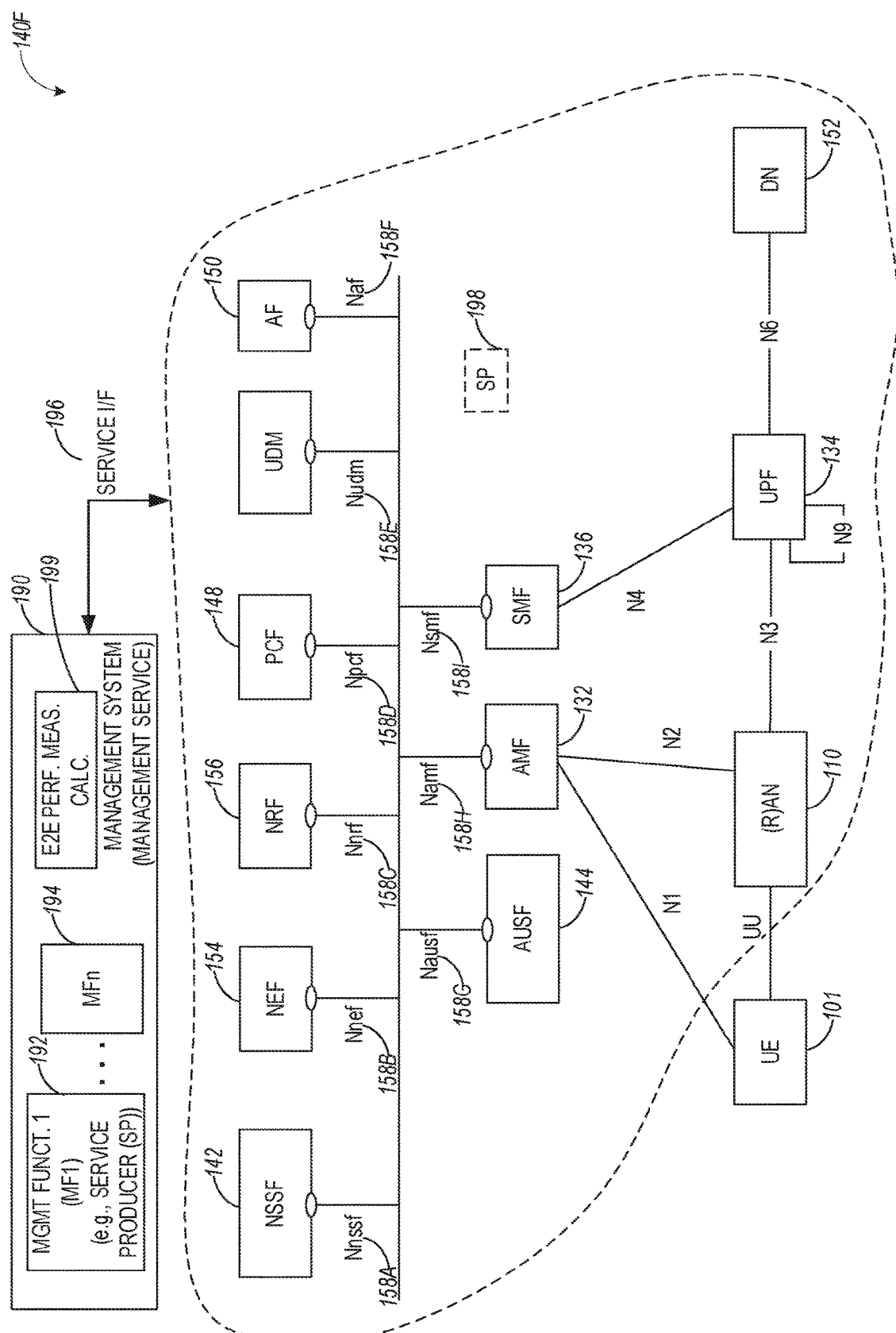

FIG. 1F illustrates a 5G system architecture 140F and a service-based representation. System architecture 140F can be substantially similar to (or the same as) system architecture 140E. In addition to the network entities illustrated in FIG. 1E, system architecture 140F can also include a network exposure function (NEF) 154 and a network repository function (NRF) 156. In some aspects, 5G system architectures can be service-based and interaction between network functions can be represented by corresponding point-to-point reference points Ni (as illustrated in FIG. 1E) or as service-based interfaces (as illustrated in FIG. 1F).

In some aspects, as illustrated in FIG. 1F, service-based representations can be used to represent network functions within the control plane that enable other authorized network functions to access their services. In this regard, 5G system architecture 140F can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 2:
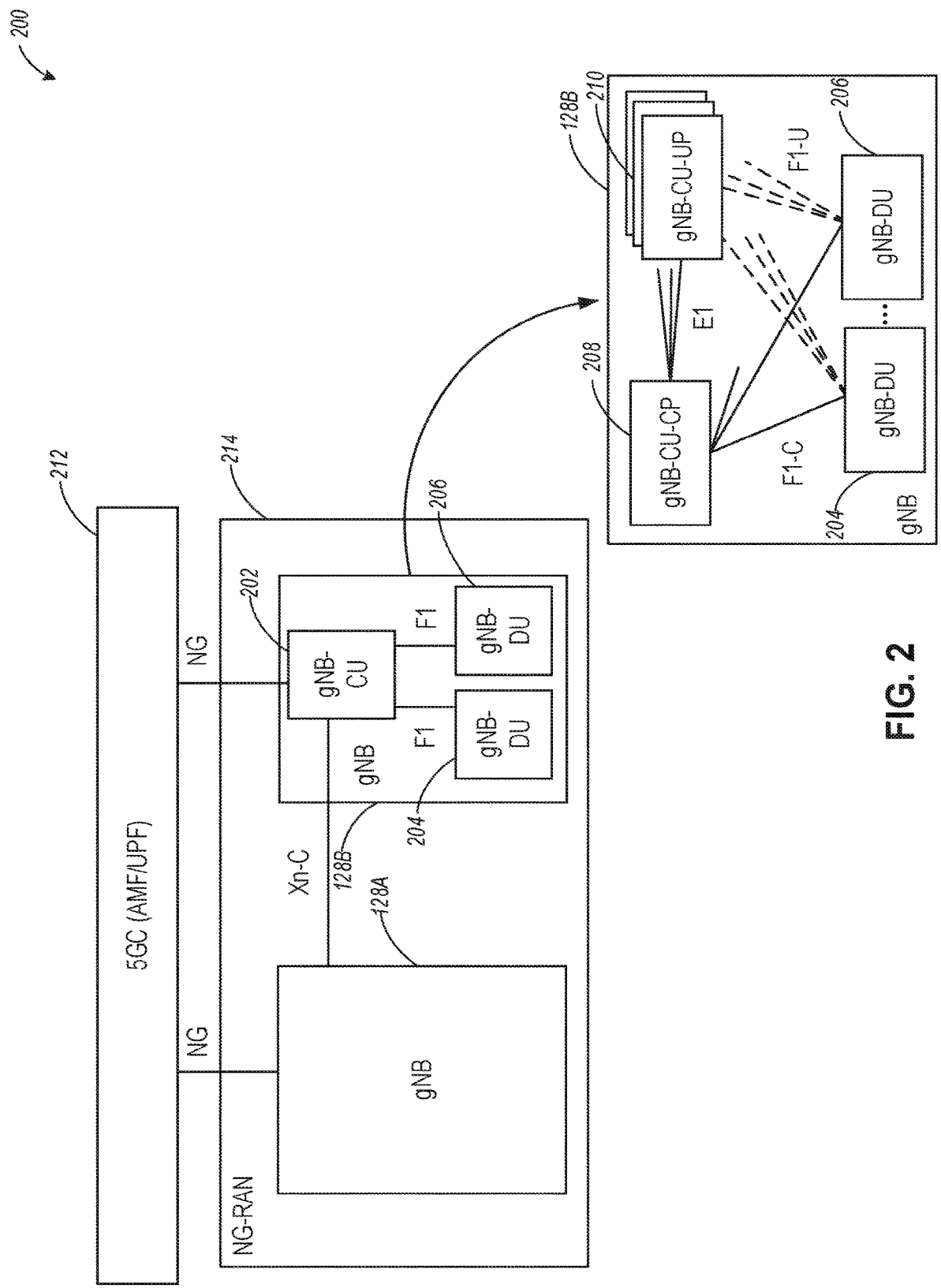
FIG. 2 illustrates components of an exemplary 5G-NR architecture with control unit control plane (CU-CP)—control unit user plane (CU-UP) separation, in accordance with some aspects.

FIG. 2 illustrates components of an exemplary 5G-NR architecture 200 with a control plane (CP)—user plane (UP) separation, in accordance with some aspects. Referring to FIG. 2, the 5G-NR architecture 200 can include a 5G core 212 and NG-RAN 214. The NG-RAN 214 can include one or more gNBs such as gNB 128A and 128B (which can be the same as gNB 128). The 5GC 212 and the NG-RAN 214, in some aspects, may be similar or the same as the 5GC 120 and the NG-RAN 110 of FIG. 1B, respectively. In some aspects, network elements of the NG-RAN 214 may be split into central and distributed units, and different central and distributed units, or components of the central and distributed units, may be configured for performing different protocol functions. For example, different protocol functions of the protocol layers depicted in FIG. 4 or FIG. 5.

In some aspects, the gNB 128B can comprise or be split into one or more of a gNB Central Unit (gNB-CU) 202 and a gNB Distributed Unit (gNB-DU) 204, 206. Additionally, the gNB 128B can comprise or be split into one or more of a gNB-CU-Control Plane (gNB-CU-CP) 208 and a gNB-CU-User Plane (gNB-CU-UP) 210. The gNB-CU 202 is a logical node configured to host the radio resource control layer (RRC), service data adaptation protocol (SDAP) layer and packet data convergence protocol layer (PDCP) protocols of the gNB or RRC, and PDCP protocols of the E-UTRA-NR gNB (en-gNB) that to controls the operation of one or more gNB-DUs. The gNB-DU (e.g., 204 or 206) is a logical node configured to host the radio link control layer (RLC), medium access control layer (MAC) and physical layer (PHY) layers of the gNB 128A, 128B or en-gNB, and its operation is at least partly controlled by gNB-CU 202. In some aspects, one gNB-DU (e.g., 204) can support one or multiple cells.

The gNB-CU 202 comprises a gNB-CU-Control Plane (gNB-CU-CP) entity 208 and a gNB-CU-User Plane entity 210. The gNB-CU-CP 208 is a logical node configured to host the RRC and the control plane part of the PDCP protocol of the gNB-CU 202 for an en-gNB or a gNB. The gNB-CU-UP 210 is a logical (or physical) node configured to host the user plane part of the PDCP protocol of the gNB-CU 202 for an en-gNB, and the user plane part of the PDCP protocol and the SDAP protocol of the gNB-CU 202 for a gNB.

The gNB-CU 202 and the gNB-DU 204, 206 can communicate via the F1 interface, and the gNB 128A can communicate with the gNB-CU 202 via the Xn-C interface. The gNB-CU-CP 208 and the gNB-CU-UP 210 can communicate via the E1 interface. Additionally, the gNB-CU-CP 208 and the gNB-DU 204, 206 can communicate via the F1-C interface, and the gNB-DU 204, 206 and the gNB-CU-UP 210 can communicate via the F1-U interface.

In some aspects, the gNB-CU 202 terminates the F1 interface connected with the gNB-DU 204, 206, and in other aspects, the gNB-DU 204, 206 terminates the F1 interface connected with the gNB-CU 202. In some aspects, the gNB-CU-CP 208 terminates the E1 interface connected with the gNB-CU-UP 210 and the F1-C interface connected with the gNB-DU 204, 206. In some aspects, the gNB-CU-UP 210 terminates the E1 interface connected with the gNB-CU-CP 208 and the F1-U interface connected with the gNB-DU 204, 206.

In some aspects, the F1 interface is a point-to-point interface between endpoints and supports the exchange of signaling information between endpoints and data transmission to the respective endpoints. The F1 interface can support control plane and user plane separation and separate the Radio Network Layer and the Transport Network Layer. In some aspects, the E1 interface is a point-to-point interface between a gNB-CU-CP and a gNB-CU-UP and supports the exchange of signaling information between endpoints. The E1 interface can separate the Radio Network Layer and the Transport Network Layer, and in some aspects, the E1 interface may be a control interface not used for user data forwarding.

Referring to the NG-RAN 214 (e.g. 110), the gNBs 128A, 128B of the NG-RAN 214 may communicate to the 5GC 212 via the NG interfaces, and can be interconnected to other gNBs via the Xn interface. In some aspects, the gNBs 128A, 128B can be configured to support FDD mode, TDD mode or dual mode operation. In certain aspects, for EN-DC, the S1-U interface and an X2 interface (e.g., X2-C interface) for a gNB, consisting of a gNB-CU and gNB-DUs, can terminate in the gNB-CU.

In some aspects, gNB 128B supporting CP/UP separation, includes a single CU-CP entity 208, multiple CU-UP entities 210, and multiple DU entities 204, . . . , 206, with all entities being configured for network slice operation. As illustrated in FIG. 2, each DU entity 204, . . . , 206 can have a single connection with the CU-CP 208 via a F1-C interface. Each DU entity 204, . . . , 206 can be connected to multiple CU-UP entities 210 using F1-U interfaces. The CU-CP entity 208 can be connected to multiple CU-UP entities 210 via E1 interfaces. Each DU entity 204, . . . , 206 can be connected to one or more UEs, and the CU-UP entities 210 can be connected to a user plane function (UPF) and the 5G core 212.

In some aspects, 5G services (e.g., enhanced mobile broadband (eMBB), ultra reliable low latency communications (URLLC), or massive machine-type communications (mMTC)) may have requirements on end-to-end (E2E) performance of the 5G network. In this regard, E2E performance measurements may be defined for 5G networks using the techniques disclosed herein. The E2E performance measurements may be used as key data to for performance assurance of 5G networks including network slicing.

In some aspects, existing 3GPP technical specifications (TSs) (e.g., TS 28.552) may be supplemented to define E2E latency measurements and may also include clarifications on how the measurements are counted and which network functions (NFs) are involved to support the E2E measurements. In some aspects, the average E2E latency may be calculated by accumulation of average delays and latencies existing on each interface and at each network function (e.g., as data is traversing a communication path from a UE towards a DN). In some aspects, the E2E virtualized resource (VR) usage measurement may be defined. Techniques disclosed herein may be used to determine which NF measurements can be used to support E2E measurements.

Examples of 5G NFs are illustrated in FIG. 1F. Referring again to FIG. 1F, in some aspects, the 5G network 140F may include a management system (or management service) 190, which is configured to offer management capabilities within the 5G network 140F. These management capabilities may be accessed by management service consumers via a service interface (e.g., 196), which may be composed of individually specified management service components. In this regard, the management system 190 may be configured to communicate with each of the NFs as well as other network entities within the network 140F, except the UE 101 (e.g., including the network entities within the dashed area in FIG. 1F). In some aspects, the management system 190 may be configured based on 3GPP TS 28.533 (v16.0.0).

In some aspects, the management system 190 may include management functions (MFs) 192, . . . , 194. In some aspects, at least one of the MFs (e.g., MF 192) may be configured as a service producer, performing one or more of the E2E performance measurement functions discussed herein. In some aspects, the service producer (e.g., 198) may be implemented within at least one of the NFs within the 5G network 140F.

In some aspects, the service producer (e.g., 192) can be configured to receive (or retrieve) performance measurements of various network entities within the network 140F and perform E2E performance measurement calculation 199 to generate E2E performance measurements. In some aspects, E2E measurements performed using techniques disclosed herein can be measurements for a sub-network, for a network slice instance (NSI), for a network slice subnet instance (NSSI), or for the whole network.

In some aspects, the following measurement definition template (described in greater detail in 3GPP TS 32.404 V15.0.0) may be used in connection with E2E performance measurements:

Measurement Name
  (a) Description.
  (b) Collection Method—contains the form in which the measurement data is obtained, including: CC (Cumulative Counter); GAUGE (dynamic variable), used when data being measured can vary up or down during the period of measurement; DER (Discrete Event Registration), when data related to a particular event are captured every nth event is registered, where n can be 1 or larger; SI (Status Inspection); TF (Transparent Forwarding); and OM (Object Mapping).
  (c) Condition—contains the condition which causes the measurement result data to be updated.
  (d) Measurement Result (measured value(s), Units). This subclause contains a description of expected result value(s) (e.g., a single integer value). If a measurement is related to "external" technologies, this subclause shall also give a brief reference to other standard bodies.
  (e) Measurement Type. This subclause contains a short form of the measurement name specified in the header, which is used to identify the measurement type in the result files.
  (f) Measurement Object Class. This subclause describes the measured Object class (e.g. UtranCell, RncFunction, SgsnFunction).
  (g) Switching Technology. This subclause contains the Switching domain(s) this measurement is applicable to i.e. Circuit Switched and/or Packet Switched.
  (h) Generation. The generation determines if it concerns a GSM, UMTS, EPS, 5GS, combined (GSM+UMTS+EPS+5GS) or IMS measurement.
  (i) Purpose. This optional clause aims at describing who will be using the measurement.

In some aspects, the service producer (192 or 198) can be configured to generate the following E2E latency measurement (described using the above template):

Average end-to-end latency measurement.
  (a) This measurement provides the average E2E latency of UE IP packets transmitted from the UE 101 to the DN 152 in the 5G network 140F. The E2E latency includes the delay on the UU interface between the UE and the RAN 110, the delay and latency in the RAN 110 (e.g., delay along the F1-U interface), the delay on the N3 interface between the RAN 110 and the UPF 134, the delay on the N9 interface within the UPF, the delay on the N6 interface between the UPF 134 and the DN 152, and the latency in the UPF and the DN. These delay measurements may be reported to the service producer or the service producer may retrieve such delay measurements from the corresponding network entity.
  (b) DER.
  (c) In some aspects, this measurement is obtained by accumulating the average DL delay on the air-interface, average DL delay in the RAN (e.g., the sum of average DL delay in gNB-DU, average DL IP latency in the gNB-DU, average DL delay on the F1-U interface, average DL delay in the CU-UP), the average delay on the N3 interface, the average delay on the N9 interface, the average delay on the N6 interface, the average latency in PDF(s). This measurement may be optionally split into sub-counters per QoS level (5QI, or QCI for option 3).
  (d) Each measurement is an integer value (in milliseconds).
  (e) LAT.UpE2E.QoS, where the QoS indicates the 5QI or QCI (for option 3).
  (f) SubNetwork; NetworkSlice; NetworkSliceSubnet.
  (g) Valid for packet switched traffic.
  (h) Combined.

In some aspects, the service producer (e.g., 192 or 198) can be configured to perform E2E measurements in connection with virtualized resource usage (e.g., in connection with an NFV framework of the NFs).

Figure 3:
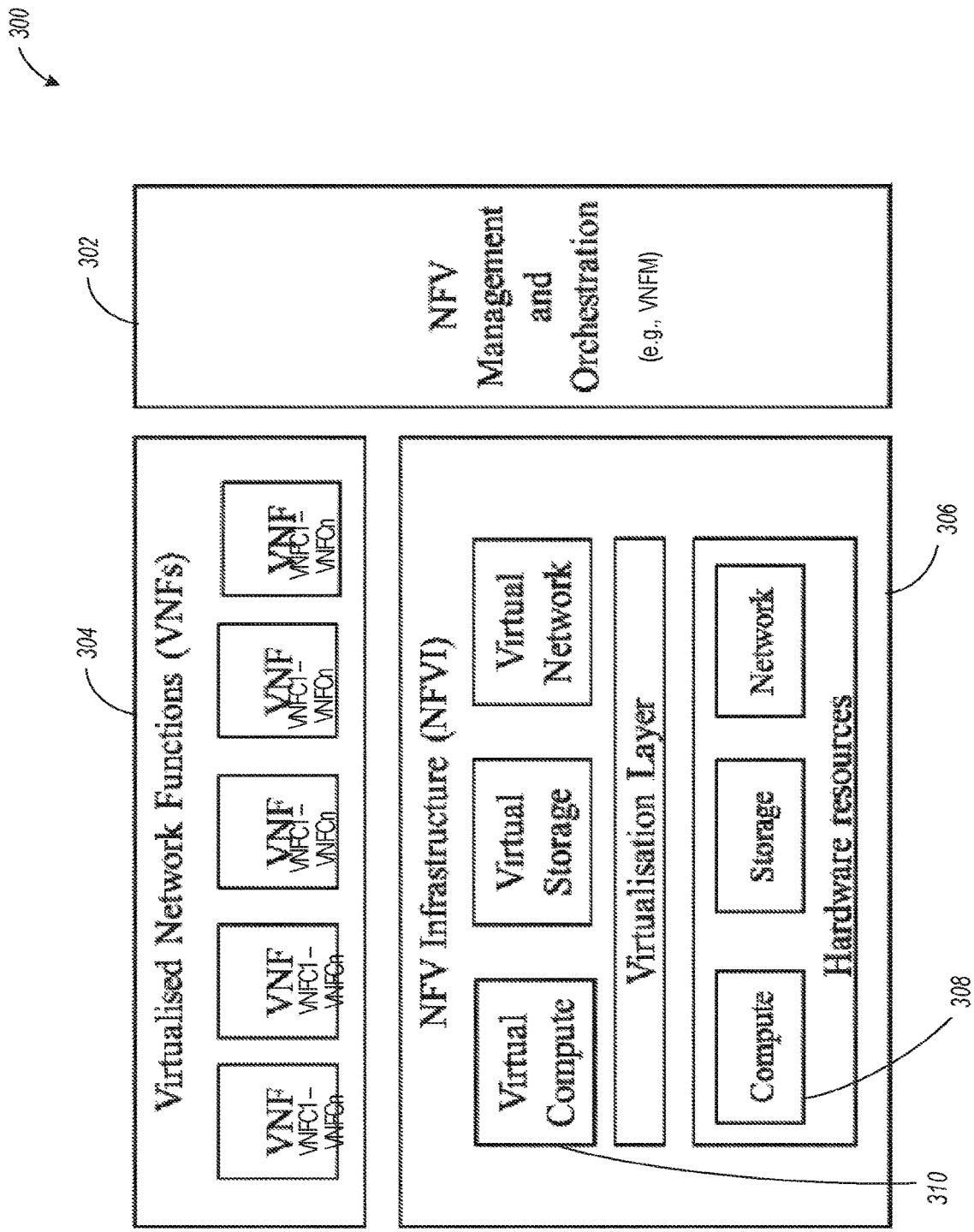
FIG. 3 illustrates a high level network function virtualization (NFV) framework, in accordance with some aspects.

FIG. 3 illustrates a high level network function virtualization (NFV) framework 300, in accordance with some aspects. Referring to FIG. 3, the NFV framework may include an NFV management and orchestration entity 302, VNFs 304, and NFV infrastructure (NFVI) 306. The NF VI 306 may include hardware resources, including compute resources 308, a virtualization layer, and corresponding virtualized resources (including virtual compute resources 310, virtual storage resources, and virtual network resources). The NFV management and orchestration entity 302 may include an NFV orchestrator, a VNF manager (VNFM), a virtualized infrastructure manager (VIM). Each VNF of the VNFs 304 may include one or more VNF components (or VNFCs), such as VNFC1, . . . , VNFCn. Each NF in the 5G network 140f may run as a VNF using virtualized resource of the NFVI 306. The NFV framework 300 may be configured and may include entities as described in connection with one or more European Telecommunications Standards Institute (ETSI) group specifications (GSs), such as ETSI GS NFV 002, ETSI GS NFV-IFA 027, or other ETSI specifications.

Mean virtualized resource usage measurement.
(a) This measurement provides the mean usage of virtualized resources (e.g., processor, memory, disk) in single subnetwork, network slice subnet, or network slice instance during the granularity period.
(b) OM.
(c) This measurement is generated with .sum suffix for the usage of each virtualized NF (e.g., see 3GPP TS 28.552) related to a single subnetwork, a network slice subnet, or a network slice instance by taking the weighted average. The algorithm of the weighted average may be vendor specific.
(d) Each measurement may be a real value (e.g., in units of %).
(e) Meal ProcessorUsage; MeanMemoryUsage; MeanDiskUsage.
(f) SubNetwork; NetworkSlice; NetworkSliceSubnet.
(g) Valid for packet switched traffic.
(h) 5GS.

In some aspects, to support E2E measurements on virtual resource (VR) usage, the following VR related measurements for NFs may be configured and used (e.g., in connection with the NFV framework 300):

Mean virtual CPU usage.
(a) This measurement provides the mean usage of the underlying virtualized CPUs for a NF.
(b) OM.
(c) This measurement is obtained by receiving the VcpuUsageMeanVnf.vComputeId measurement(s) (see ETSI GS IFA 027) for the VNFC instances(s) from VNFM, and mapping the measured object of each received measurement from the VNFC instance to the managed object instance (MOI) of the measured NF. The measurement may be generated by taking the weighted average of the values of the VcpuUsageMeanVnf.vComputeId measurement(s) whose measured object(s) are mapped to the MOI of the measured NF. In some aspects, the algorithm of the weighted average may be vendor specific.
(d) A single integer value (Unit: %).
(e) VR.VCpuUsageMean.
(f) Example NFs that can be used in connection with this measurement can be represented by MOIs of: GNBDUFunction; GNBCUCPFunction; GNBCUUPFunction; GNBCUFunction; AMFFunction; SMFFunction; UPFFunction; N3IWFFunction; PCFFunction; AUSFFunction; UDMfunction; UDRFunction; UDSFFunction; NRFFunction; NSSFFunction; SMSFFunction; LMFFunction; NWDAFFunction; NGEIRFunction; SEPPFunction.
(g) Valid for packet switched traffic.
(h) 5GS.

Mean virtual memory usage.
(a) This measurement provides the mean usage of the underlying virtualized memories for a NF.
(b) OM.
(c) This measurement is obtained by receiving the VmemoryUsageMeanVnf.vComputeId measurement(s) (see ETSI GS IFA 027) for the VNFC instances(s) from VNFM, and mapping the measured object of each received measurement from VNFC instance to the MOI of measured NF. The measurement is generated by taking the weighted average of the values of the VmemoryUsageMeanVnf.vComputeId measurement(s) whose measured object(s) are is mapped to the MOI of the measured NF. The algorithm of the weighted average may be vendor specific.
(d) A single integer value (Unit: %)
(e) VR.VMemoryUsageMean.
(f) Example NFs that can be used in connection with this measurement can be represented by MOIs of: GNBDUFunction; GNBCUCPFunction; GNBCUUPFunction; GNBCUFunction; AMFFunction; SMFFunction; UPFFunction; N3IWFFunction; PCFFunction; AUSFFunction; UDMFunction; UDRFunction; UDSFFunction; NRFFunction; NSSFFunction; SMSFFunction; LMFFunction; NWDAFFunction; NGEIRFunction; SEPPFunction.
(g) Valid for packet switched traffic.
(h) 5GS.

Mean virtual disk usage.
(a) This measurement provides the mean usage of the underlying virtualized disks for a NE.
(b) OM.
(c) This measurement is obtained by receiving the VdiskUsageMeanVnf.vComputeId measurement(s) (see ETSI GS IFA 027 [x]) for the VNFC instances(s) from VNFM, and mapping the measured object of each received measurement from VNFC instance to the MOI of measured NF. The measurement is generated by taking the weighted average of the values of the VdiskUsageMeanVnf.vComputeId measurement(s) whose measured object(s) are mapped to the MOI of the measured NF. The algorithm of the weighted average may be vendor specific.
(d) A single integer value (Unit: %).
(e) VR.VDiskUsageMean
(f) Example NFs that can be used in connection with this measurement can be represented by MOIs of: GNBDUFunction; GNBCUCPFunction, GNBCUUPFunction; GNBCUFunction; AMFFunction; SMFFunction; UPFFunction; N3IWFFunction; PCFFunction; AUSFFunction; UDMFunction; UDRFunction; UDSFFunction; NRFFunction; NSSFFunction; SMSFFunction; LMFFunction; NWDAFFunction; NGEIRFunction; SEPPFunction.
(g) Valid for packet switched traffic.
(h) 5GS.

In some aspects, a service producer supported by one or more processors, is configured to obtain the performance measurements of NF(s), calculate E2E performance measurements based on the obtained performance measurements, and generate the end to end performance measurements. The E2E performance measurements are for a subnetwork, an NSI, or an NSSI. The subnetwork is represented by the Managed Object Instance (MOI) of a subnetwork. The NSI is represented by the MOI of a network slice. The NSSI is represented by the MOI of a network slice subnet. The E2E performance measurement includes an average E2E latency. The average E2E latency is accumulation of average DL delay on air-interface, average DL delay in RAN (e.g., the sum of average DL delay in gNB-DU, average DL IP latency in gNB-DU, average DL delay on F1-U, average DL delay in CU-UP), the average delay on N3, the average delay on N9, the average delay on N6, the average latency in PDF(s).

The average E2E latency is measured per 5QI or per QCI. The E2E performance measurement is mean E2E VR usage. The mean E2E VR usage is calculated based on mean VR usage of NF(s). The mean VR usage of NF is mean virtual CPU usage, mean virtual memory usage, or mean virtual disk usage. The NF is one or more of gNB, gNB-CU, gNB-CUCP, gNB-CUUPA, AMF, SMF, UPF, N3IWF, PCF, AUSF, UDM, UDR, NRF, NSSF, SMSF, LMF, NWDAF, NGEIR or SEPP. The NE is represented by MOI of GNBDUFunction, GNBCUCPFunction, GNBCUUPFunction, GNBCUFunction, AMFFunction, SMFFunction, UPFFunction, N3IWFFunction, PCFFunction, AUSFFunction, UDMFunction, UDRFunction, UDSFFunction, NRFFunction, NSSFFunction, SMSFFunction, LMFFunction, NWDAFFunction, NGEIRFunction or SEPPFunction.

In some aspects, a service producer supported by one or more processors generates the mean VR usage by receiving the VR usage measurements for VNFC instance(s) from VNFM, mapping the measured object of each received measurement from VNFC instance to MOI of the measured NF, and taking weighted average of the VR usage measurements whose measured object(s) are mapped to the MOI of the measured NF. The VR usage measurement received from the VNFM is VcpuUsageMeanVnf.vComputeId, VmemoryUsageMeanVnf.vComputeId or VdiskUsageMeanVnf.vComputeId.

Figure 4:
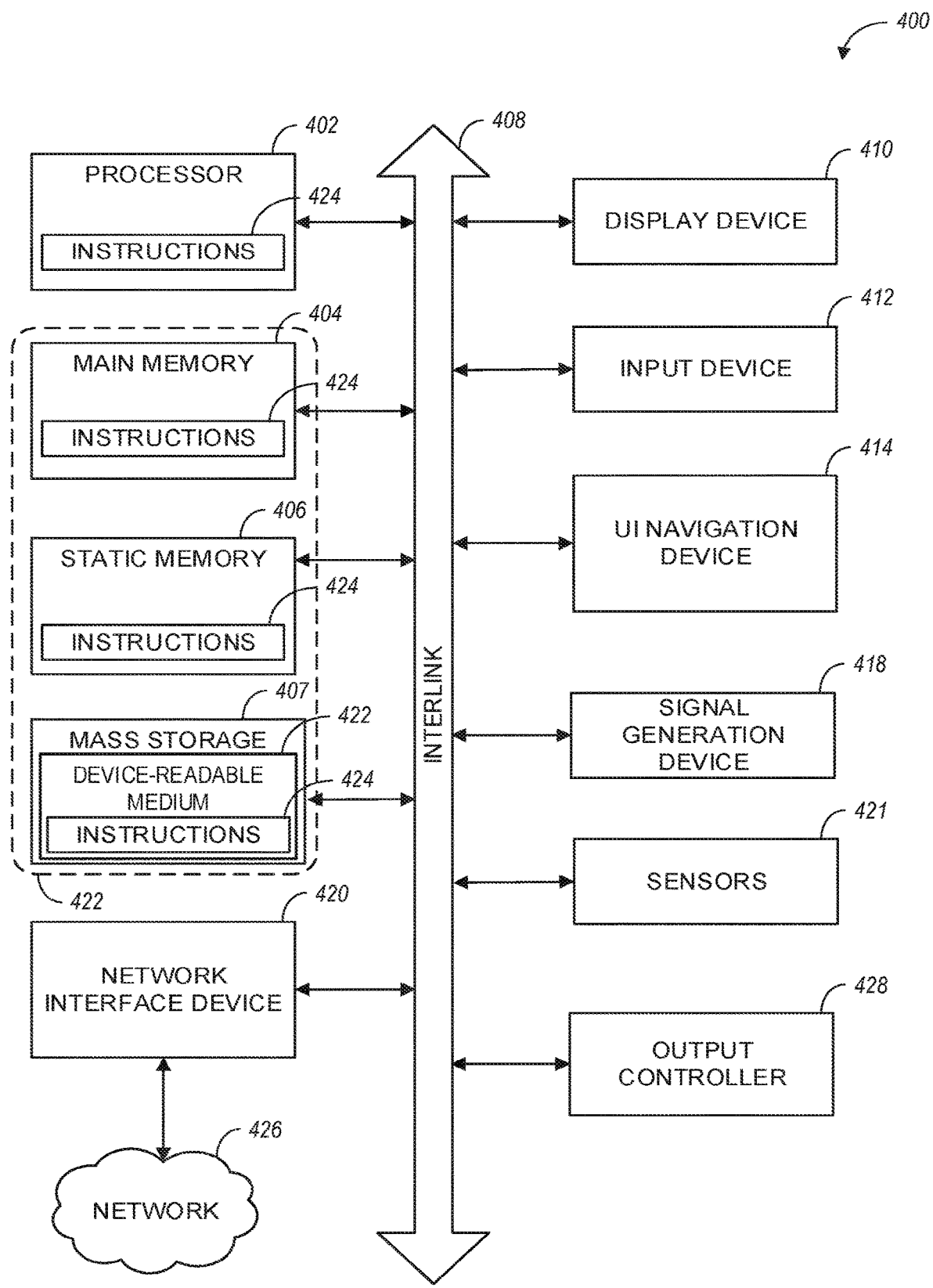
FIG. 4 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 4 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 400 may operate as a standalone device or may be connected (e.g., networked) to other communication devices.

Circuitry (e.g., processing circuitry) is a collection of circuits implemented intangible entities of the device 400 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 400 follow.

In some aspects, the device 400 may operate as a standalone device or may be connected (e.g. networked) to other devices. In a networked deployment, the communication device 400 may operate in the capacity of a server communication device, a client communication device, or both in server-client network environments. In an example, to the communication device 400 may act as a peer communication device in peer-to-peer (P2P) (or other distributed) network environment. The communication device 400 may be a eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 400 may include a hardware processor 402 (e.g., a central processing unit (CPU), a graphics processing unit (GPU), a hardware processor core, or any combination thereof), a main memory 404, a static memory 406, and mass storage 407 (e.g., hard drive, tape drive, flash storage, or other block or storage devices), some or all of which may communicate with each other via an interlink. (e.g., bus) 408.

The communication device 400 may further include a display device 410, an alphanumeric input device 412 (e.g., a keyboard), and a user interface (UI) navigation device 414 (e.g., a mouse). In an example, the display device 410, input device 412 and UI navigation device 414 may be a touch-screen display. The communication device 400 may additionally include a signal generation device 418 (e.g., a speaker), a network interface device 420, and one or more sensors 421, such as a global positioning system (GPS) sensor, compass, accelerometer, or another sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 407 may include a communication device-readable medium 422, on which is stored one or more sets of data structures or instructions 424 (e.g., software) embodying or utilized by any one or more of the techniques or functions described herein. In some aspects, registers of the processor 402, the main memory 404, the static memory 406, and/or the mass storage 407 may be, or include (completely or at least partially), the device-readable medium 422, on which is stored the one or more sets of data structures or instructions 424, embodying or utilized by any one or more of the techniques or functions described herein. In an example, one or any combination of the hardware processor 402, the main memory 404, the static memory 406, or the mass storage 416 may constitute the device-readable medium 422.

As used herein, the term "device-readable medium" is interchangeable with "computer-readable medium" or "machine-readable medium". While the communication device-readable medium 422 is illustrated as a single medium, the term "communication device-readable medium" may include a single medium or multiple media (e.g., a centralized or distributed database, and/or associated caches and servers) configured to store the one or more instructions 424.

The team "communication device-readable medium" is inclusive of the terms "machine-readable medium" or "computer-readable medium", and may include any medium that is capable of storing, encoding, or carrying instructions (e.g., instructions 424) for execution by the communication device 400 and that cause the communication device 400 to perform any one or more of the techniques of the present disclosure, or that is capable of to storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 424 may further be transmitted or received over a communications network 426 using a transmission medium via the network interface device 420 utilizing any one of a number of transfer protocols. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input-multiple-output (SIMO), MIMO, or multiple-input-single-output (MISO) techniques. In some examples, the network interface device 420 may wirelessly communicate using Multiple User MIMO techniques.

The term in "transmission medium" shall be taken to include any intangible medium that is capable of storing, encoding or carrying instructions for execution by the communication device 400, and includes digital or analog communications signals or another intangible medium to facilitate communication of such software. In this regard, a transmission medium in the context of this disclosure is a device-readable medium.

A communication device-readable medium may be provided by a storage device or other apparatus which is capable of hosting data in a non-transitory format. In an example, information stored or otherwise provided on a communication device-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the communication device-readable medium may be processed by processing circuitry into the instructions to implement any of the operations to discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus comprising:
one or more processors, wherein to configure a management equipment for end-to-end (E2E) performance measurements in a cellular network with a plurality of network functions (NFs), the one or more processors are configured to cause the management equipment to:
perform an E2E performance measurement calculation to determine an E2E latency associated with communicating an internet protocol (IP) packet including delay on a Uu interface between a user equipment (UE) and a radio access network (RAN), and on a N9 interface of one or more user plane function (UPF); and
generate average E2E latency per network slice key performance indicator based on the E2E performance measurement calculation.

2. The apparatus of claim 1, wherein the one or more processors are configured to determine a RAN latency, wherein the RAN latency includes a communication delay associated with communicating the IP packet on the Uu interface between the UE and the RAN.

3. The apparatus of claim 2, wherein the RAN includes a next generation Node-B (gNB) and the RAN latency further includes a communication delay associated with communicating the IP packet on an F1-U interface between a gNB Central Unit User Plane (gNB-CU-UP) and a gNB Distributed Unit (gNB-DU) of the gNB.

4. The apparatus of claim 3, wherein the communication delay associated with communicating the IP packet on the F1-U interface includes a downlink delay in the gNB-CU-UP and the gNB-DU.

5. The apparatus of claim 2, wherein the RAN latency is received via at least one of the plurality of NFs.

6. The apparatus of claim 1, wherein the one or more processors are configured to:
determine a UPF latency based on a communication delay associated with communicating the IP packet on an N3 interface between a RAN and the UPF.

7. The apparatus of claim 1, wherein the one or more processors are configured to:
determine a data network (DN) latency associated with communication of the IP packet between the UPF and a DN based on a communication delay associated with communicating the IP packet on an N6 interface between the UPF and the DN.

8. The apparatus of claim 1, wherein the average E2E latency is associated with a sub-network, a network slice instance (NSI), or a network slice sub-instance (NS SI) of the cellular network.

9. The apparatus of claim 1, further comprising transceiver circuitry coupled to the one or more processors; and, one or more antennas coupled to the transceiver circuitry.

10. A non-transitory computer-readable storage medium that stores instructions for execution by one or more processors of a management equipment for end-to-end (E2E) performance measurements in a cellular network with a plurality of network functions (NFs), the instructions to cause the management equipment to:
perform an E2E performance measurement calculation to determine an E2E latency associated with communicating an internet protocol (IP) packet including delay on a Uu interface between a user equipment (UE) and a radio access network (RAN), and on a N9 interface of one or more user plane function (UPF); and
generate average E2E latency per network slice key performance indicator based on the E2E performance measurement calculation.

11. The non-transitory computer-readable storage medium of claim 10, wherein the one or more processors are configured to determine a RAN latency, wherein the RAN latency includes a communication delay associated with communicating the IP packet on the Uu interface between the UE and the RAN.

12. The non-transitory computer-readable storage medium of claim 11, wherein the RAN includes a next generation Node-B (gNB) and the RAN latency further includes a communication delay associated with communicating the IP packet on an F1-U interface between a gNB Central Unit User Plane (gNB-CU-UP) and a gNB Distributed Unit (gNB-DU) of the gNB.

13. The non-transitory computer-readable storage medium of claim 12, wherein the communication delay associated with communicating the IP packet on the F1-U interface includes a downlink delay in the gNB-CU-UP and the gNB-DU.

14. The non-transitory computer-readable storage medium of claim 10, wherein executing the instructions further cause the management equipment to:
determine a UPF latency based on a communication delay associated with communicating the IP packet on an N3 interface between a RAN and the UPF.

15. The non-transitory computer-readable storage medium of claim 10, wherein executing the instructions further cause the management equipment to:
determine a data network (DN) latency associated with communication of the IP packet between the UPF and a DN based on a communication delay associated with communicating the IP packet on an N6 interface between the UPF and the DN.

16. A method for operating management equipment for end-to-end (E2E) performance measurements in a cellular network with a plurality of network functions (NFs), comprising:
by the management equipment to:
performing an E2E performance measurement calculation to determine an E2E latency associated with communicating an internet protocol (IP) packet including delay on a Uu interface between a user equipment (UE) and a radio access network (RAN), and on a N9 interface of one or more user plane function (UPF); and
generating average E2E latency per network slice key performance indicator based on the E2E performance measurement calculation.

17. The method of claim 16, further comprising:
determining a RAN latency, wherein the RAN latency includes a communication delay associated with communicating the IP packet on the Uu interface between the UE and the RAN.

18. The method of claim 17, wherein the RAN includes a next generation Node-B (gNB) and the RAN latency further includes a communication delay associated with communicating the IP packet on an F1-U interface between a gNB Central Unit User Plane (gNB-CU-UP) and a gNB Distributed Unit (gNB-DU) of the gNB.

19. The method of claim 16, further comprising:
determining a UPF latency based on a communication delay associated with communicating the IP packet on an N3 interface between a RAN and the UPF.

20. The method of claim 16, further comprising:
determining a data network (DN) latency associated with communication of the IP packet between the UPF and a DN based on a communication delay associated with communicating the IP packet on an N6 interface between the UPF and the DN.

\* \* \* \* \*